(12) United States Patent
Funke et al.

(10) Patent No.: US 10,915,521 B2
(45) Date of Patent: Feb. 9, 2021

(54) BLOCKCHAIN GATEWAY DEVICE AND ASSOCIATED METHOD OF USE

(71) Applicant: Syniverse Technologies, LLC, Tampa, FL (US)

(72) Inventors: Olaf Funke, Weilerbach (LU); Guido Reissner, Udenheim (DE)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/410,654

(22) Filed: May 13, 2019

(65) Prior Publication Data

US 2020/0065301 A1 Feb. 27, 2020

Related U.S. Application Data

(60) Provisional application No. 62/720,460, filed on Aug. 21, 2018.

(51) Int. Cl.
*G06F 16/00* (2019.01)
*G06F 16/23* (2019.01)
*G06F 16/22* (2019.01)
*G06F 16/245* (2019.01)

(52) U.S. Cl.
CPC .......... *G06F 16/2379* (2019.01); *G06F 16/22* (2019.01); *G06F 16/2365* (2019.01); *G06F 16/245* (2019.01)

(58) Field of Classification Search
CPC .......... G06F 16/20; G06F 16/22; G06F 16/23; G06F 16/27; G06F 16/93; G06F 16/182; G06F 16/245; G06F 16/258; G06F 16/273; G06F 16/1805; G06F 16/2365; G06F 16/2379
See application file for complete search history.

(56) References Cited

U.S. PATENT DOCUMENTS

| | | | |
|---|---|---|---|
| 9,855,785 B1* | 1/2018 | Nagelberg | G06K 7/10722 |
| 9,934,502 B1* | 4/2018 | Grassadonia | G06Q 20/10 |
| 10,057,243 B1* | 8/2018 | Kumar | H04L 9/0891 |
| 10,102,265 B1* | 10/2018 | Madisetti | G06Q 20/06 |
| 10,121,025 B1* | 11/2018 | Rice | G06F 21/10 |
| 10,452,699 B1* | 10/2019 | Keskar | H04L 9/3228 |
| 10,505,737 B1* | 12/2019 | Xu | H04L 9/0894 |
| 10,635,722 B2* | 4/2020 | Ruschin | G06F 16/27 |
| 10,652,184 B1* | 5/2020 | Winter | H04L 9/3239 |
| 10,671,712 B1* | 6/2020 | Lindley | H04L 63/12 |
| 2016/0012465 A1* | 1/2016 | Sharp | G06Q 20/384 705/14.17 |

(Continued)

OTHER PUBLICATIONS

International Search Report and Written Opinion dated Oct. 22, 2019 for corresponding PCT International Application No. PCT/US2019/046347.

*Primary Examiner* — Ashish Thomas
*Assistant Examiner* — Rezwanul Mahmood
(74) *Attorney, Agent, or Firm* — Molly L. Sauter; Smith & Hopen, P.A.

(57) ABSTRACT

A blockchain gateway device and associated method of use for reconciling and insuring the consistency of integrated blockchain networks and legacy database-based systems. The blockchain gateway device and associated blockchain scheme harmonizes and reconciles the data elements from multiple independent blockchain databases.

17 Claims, 4 Drawing Sheets

(56) References Cited

U.S. PATENT DOCUMENTS

| | | | |
|---|---|---|---|
| 2016/0085955 A1* | 3/2016 | Lerner | G06F 21/725 726/20 |
| 2017/0054611 A1* | 2/2017 | Tiell | H04L 43/0876 |
| 2017/0103167 A1* | 4/2017 | Shah | G06Q 50/22 |
| 2017/0213289 A1* | 7/2017 | Doney | G06Q 40/025 |
| 2017/0234709 A1* | 8/2017 | Mackie | H04Q 9/00 73/861.08 |
| 2017/0293669 A1* | 10/2017 | Madhavan | G06F 16/2365 |
| 2017/0295023 A1* | 10/2017 | Madhavan | H04L 9/3247 |
| 2017/0295232 A1* | 10/2017 | Curtis | G06F 9/466 |
| 2017/0364699 A1* | 12/2017 | Goldfarb | G06F 21/6227 |
| 2018/0005186 A1* | 1/2018 | Hunn | G06F 40/103 |
| 2018/0027027 A1* | 1/2018 | Leung | H04L 65/1003 709/206 |
| 2018/0060927 A1* | 3/2018 | Gupta | H04W 4/14 |
| 2018/0075527 A1* | 3/2018 | Nagla | G06Q 40/025 |
| 2018/0075536 A1* | 3/2018 | Jayaram | G06Q 20/405 |
| 2018/0143995 A1* | 5/2018 | Bailey | G06F 21/64 |
| 2018/0157688 A1* | 6/2018 | Zessin | G06F 16/2219 |
| 2018/0173747 A1* | 6/2018 | Baird, III | G06F 16/27 |
| 2018/0204216 A1* | 7/2018 | Jayaram | G06Q 20/405 |
| 2018/0268483 A1* | 9/2018 | Jayaram | G06F 16/258 |
| 2018/0268504 A1* | 9/2018 | Paolini-Subramanya | G06Q 20/3823 |
| 2018/0285840 A1* | 10/2018 | Hasan | G06Q 20/0655 |
| 2018/0315141 A1* | 11/2018 | Hunn | G06F 40/42 |
| 2018/0329945 A1* | 11/2018 | Horii | G06F 9/466 |
| 2018/0336286 A1* | 11/2018 | Shah | G06Q 30/06 |
| 2018/0337904 A1* | 11/2018 | Letourneau | H04L 63/06 |
| 2018/0343339 A1* | 11/2018 | Lotter | H04M 15/00 |
| 2018/0375750 A1* | 12/2018 | Moeller | H04L 63/166 |
| 2019/0013948 A1* | 1/2019 | Mercuri | H04L 9/3239 |
| 2019/0018867 A1* | 1/2019 | Li | G06Q 30/00 |
| 2019/0020648 A1* | 1/2019 | Haque | H04L 63/0823 |
| 2019/0034919 A1* | 1/2019 | Nolan | G06Q 20/38215 |
| 2019/0034936 A1* | 1/2019 | Nolan | G06Q 20/027 |
| 2019/0035018 A1* | 1/2019 | Nolan | G06Q 20/36 |
| 2019/0036887 A1* | 1/2019 | Miller | H04L 63/104 |
| 2019/0044818 A1* | 2/2019 | Nolan | H04L 41/0654 |
| 2019/0050810 A1* | 2/2019 | Nagalla | H04L 9/3297 |
| 2019/0050856 A1* | 2/2019 | Vintila | H04L 9/0825 |
| 2019/0059762 A1* | 2/2019 | Starr | A61B 5/0476 |
| 2019/0080392 A1* | 3/2019 | Youb | G06F 16/1805 |
| 2019/0102409 A1* | 4/2019 | Shi | H04L 9/3239 |
| 2019/0108586 A1* | 4/2019 | Jayaram | G06Q 40/04 |
| 2019/0149426 A1* | 5/2019 | Almasan | G06N 20/00 709/224 |
| 2019/0158594 A1* | 5/2019 | Shadmon | H04L 9/088 |
| 2019/0171744 A1* | 6/2019 | Ananthapur Bache | H04L 9/0637 |
| 2019/0180274 A1* | 6/2019 | Johnson | G06Q 20/381 |
| 2019/0197620 A1* | 6/2019 | Jayaram | G06Q 40/04 |
| 2019/0228385 A1* | 7/2019 | Jayaram | G06Q 40/04 |
| 2019/0245699 A1* | 8/2019 | Irwan | H04L 9/3268 |
| 2019/0253434 A1* | 8/2019 | Biyani | H04L 63/065 |
| 2019/0266178 A1* | 8/2019 | Madhavan | G06F 16/2365 |
| 2019/0303463 A1* | 10/2019 | Catalano | G06F 16/22 |
| 2019/0303942 A1* | 10/2019 | Balaraman | G06Q 20/4016 |
| 2019/0325522 A1* | 10/2019 | Bathia | G06K 9/00785 |
| 2019/0327080 A1* | 10/2019 | Liu | H04L 9/3247 |
| 2019/0327081 A1* | 10/2019 | Ow | H04L 9/3213 |
| 2019/0327082 A1* | 10/2019 | Ow | H04L 9/3213 |
| 2019/0332783 A1* | 10/2019 | Bhardwaj | H04L 9/3239 |
| 2019/0332921 A1* | 10/2019 | Rodriguez | H04L 9/0643 |
| 2019/0340269 A1* | 11/2019 | Biernat | G06F 16/248 |
| 2019/0349733 A1* | 11/2019 | Nolan | H04L 41/0806 |
| 2019/0354943 A1* | 11/2019 | Mulye | H04N 21/2407 |
| 2019/0354964 A1* | 11/2019 | Snow | G06F 16/1805 |
| 2019/0377904 A1* | 12/2019 | Sinha | H04L 9/0637 |
| 2019/0385165 A1* | 12/2019 | Castinado | H04W 12/06 |
| 2020/0005292 A1* | 1/2020 | Mao | H04L 9/3247 |
| 2020/0005388 A1* | 1/2020 | Lim | G06Q 30/0645 |
| 2020/0005410 A1* | 1/2020 | McKee | G06F 21/64 |
| 2020/0019616 A1* | 1/2020 | Sukhija | H04L 9/3239 |
| 2020/0026834 A1* | 1/2020 | Vimadalal | G06F 16/182 |
| 2020/0034353 A1* | 1/2020 | Innocenti | G06F 16/2365 |
| 2020/0034469 A1* | 1/2020 | Sato | G06F 16/1834 |
| 2020/0042635 A1* | 2/2020 | Douglass | H04L 9/3239 |
| 2020/0042960 A1* | 2/2020 | Cook | G06F 16/27 |
| 2020/0050386 A1* | 2/2020 | Natarajan | G06F 3/067 |
| 2020/0050690 A1* | 2/2020 | Gaur | H04L 9/3239 |
| 2020/0051146 A1* | 2/2020 | Gupta | G06Q 30/0601 |
| 2020/0052879 A1* | 2/2020 | Gaur | H04L 63/123 |
| 2020/0057822 A1* | 2/2020 | Sow | H04L 9/3239 |
| 2020/0065300 A1* | 2/2020 | Yang | G06F 16/2379 |
| 2020/0065301 A1* | 2/2020 | Funke | G06F 16/245 |
| 2020/0073758 A1* | 3/2020 | Natarajan | H04L 9/3239 |
| 2020/0073962 A1* | 3/2020 | Natarajan | H04L 69/40 |
| 2020/0074118 A1* | 3/2020 | Sutton | G06F 16/2358 |
| 2020/0074423 A1* | 3/2020 | Noble | H04L 9/3239 |
| 2020/0074456 A1* | 3/2020 | Coleman | G06Q 20/382 |
| 2020/0074457 A1* | 3/2020 | Coleman | G06Q 20/0655 |
| 2020/0074458 A1* | 3/2020 | Govindarajan | G06Q 20/065 |
| 2020/0074463 A1* | 3/2020 | Noble | G06Q 20/3829 |
| 2020/0076571 A1* | 3/2020 | Natarajan | G06F 16/2246 |
| 2020/0076572 A1* | 3/2020 | Irazabal | H04L 9/0643 |
| 2020/0076608 A1* | 3/2020 | Irazabal | H04L 9/3239 |
| 2020/0089915 A1* | 3/2020 | Falk | H04L 9/3297 |
| 2020/0092088 A1* | 3/2020 | Novotny | H04L 9/0894 |
| 2020/0119925 A1* | 4/2020 | Wang | H04L 9/0637 |
| 2020/0167336 A1* | 5/2020 | Somani | G06Q 40/12 |
| 2020/0186355 A1* | 6/2020 | Davies | H04L 9/3239 |
| 2020/0233950 A1* | 7/2020 | Assenmacher | G06F 21/44 |
| 2020/0296082 A1* | 9/2020 | Killoran, Jr. | H04L 63/102 |

* cited by examiner

BLOCKCHAIN GATEWAY DEVICE AND ASSOCIATED METHOD OF USE

CROSS-REFERENCE TO RELATED APPLICATIONS

This application claims priority to U.S. Provisional Patent Application No. 62/720,460, entitled "Heterogenous Blockchain Integration Method and System," filed Aug. 21, 2018, the entirety of which is incorporated herein by reference.

BACKGROUND OF THE INVENTION

Various blockchain technologies are known in the art which, on their own, are consistent and by definition provide a consensus state. However, often these various blockchain technologies need to be integrated into a common system. The integration of several blockchain networks or the integration of a blockchain network with legacy database-based systems may introduce inconsistencies due to different consensus mechanics, data models and data quality.

Accordingly, what is needed in the art is a system and method for reconciling and insuring the consistency of different blockchain networks and legacy database-based systems that are integrated into a common system.

BRIEF SUMMARY OF THE INVENTION

In various embodiments, the present invention provides a blockchain gateway device and associated method of use for reconciling and insuring the consistency of integrated blockchain networks and legacy database-based systems. The blockchain gateway device and associated blockchain scheme harmonizes and reconciles the data elements from multiple independent blockchain databases.

In one embodiment, the present invention provides a computer-implemented method, which includes, integrating a blockchain gateway device as a non-participating node in two or more independent blockchain networks, wherein the two or more independent blockchain networks have at least one common participant. The method further includes, intercepting a blockchain query from the at least one common participant at the blockchain gateway device, and retrieving, by the blockchain gateway device, a data record from a state database associated with each of the two or more independent blockchain networks based upon the blockchain query, wherein the data record comprises a plurality of data elements. The method continues by comparing, by the blockchain gateway device, the data elements of the data record retrieved from the state database associated with each of the two or more independent blockchain networks to identify conflicting data elements in the state records of the two or more independent blockchain networks. Following the comparison of the data elements, the method further includes, reconciling the conflicting data elements in the data records when conflicting data elements are identified to generate a reconciled data record, storing the reconciled data record in a reconciled state database of a reconciled blockchain network, wherein the blockchain gateway device is a node in the reconciled blockchain network and delivering the reconciled data record to the at least one common participant from the reconciled blockchain network.

In the present invention, the blockchain gateway device applies a predetermined set of rules to the conflicting data elements to determine which of the conflicting data elements will be maintained in the reconciled data record.

In additional embodiment, the blockchain gateway device may be integrated as a node in a legacy database which includes the at least one common participant and the method may include comparing the data elements of data records from the legacy database with those of the various blockchain networks and reconciling the data elements, as previously described.

In the present invention, the two or more independent blockchain networks that are reconciled by the blockchain gateway device may be based on the same blockchain technology or on different blockchain technologies. The blockchain technologies may include, but are not limited to, Bitcoin, Ethereum and Hyperledger.

In another embodiment, the present invention provides a blockchain gateway system, the device which includes, a processor and one or more memory devices storing computer-executable instructions that, when executed with the processor, cause the system to integrate as a node in two or more independent blockchain networks, wherein the two or more independent blockchain networks have at least one common participant. The instructions further cause the system to intercept a blockchain query from the at least one common participant at the blockchain gateway device, retrieve a data record from a state database associated with each of the two or more independent blockchain networks based upon the blockchain query, wherein the data record comprises a plurality of data elements, compare the data elements of the data record retrieved from the state database associated with each of the two or more independent blockchain networks to identify conflicting data elements in the state records of the two or more independent blockchain networks, reconcile the conflicting data elements in the data records when conflicting data elements are identified to generate a reconciled data record, store the reconciled data record in a reconciled state database of a reconciled blockchain network and deliver the reconciled data record to the at least one common participant from the reconciled blockchain network.

In an additional embodiment, the present invention provides a non-transitory computer-readable storage medium comprising computer-readable instructions which, when executed by one or more processors, cause the one or more processors to integrate as a node in two or more independent blockchain networks, wherein the two or more independent blockchain networks have at least one common participant and intercept a blockchain query from the at least one common participant at the blockchain gateway device. The computer-readable instructions further cause the one or more processors to retrieve a data record from a state database associated with each of the two or more independent blockchain networks based upon the blockchain query, wherein the data record comprises a plurality of data elements, compare the data elements of the data record retrieved from the state database associated with each of the two or more independent blockchain networks to identify conflicting data elements in the state records of the two or more independent blockchain networks, reconcile the conflicting data elements in the data records when conflicting data elements are identified to generate a reconciled data record, store the reconciled data record in a reconciled state database of a reconciled blockchain network and deliver the reconciled data record to the at least one common participant from the reconciled blockchain network.

In various embodiment, the present invention provides a blockchain gateway device and associated method of use, wherein the blockchain gateway device becomes a node in each of the different blockchain networks, thereby obtaining access to all the data records in the different blockchain networks. The blockchain gateway device then addresses any differences between records that are expected to contain the same data elements in the data record and reconciles any inconsistencies between the data elements.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

A blockchain is a continuously growing list of records, which are structured in blocks, linked and secured using cryptography. Each block may contain a hash pointer as a link to a previous block, a timestamp, and transactional data. By design, a blockchain is inherently resistant to modification of the transactional data. A blockchain may be managed by a peer-to-peer network of device nodes, which collectively adhere to a consensus protocol for validating newly added blocks. Once recorded, the transaction data in a given block cannot be altered retroactively without the alteration of all previous blocks, which requires consensus of a majority of the network nodes.

A blockchain is essentially a type of distributed ledger that is shared among the network nodes, or participants. The participants may be individuals or institutions, such as a business, university, or hospital. Various business transactions, such as the exchange of assets or data, are permanently recorded in the blockchain ledger in sequential, append-only, tamper-evident blocks. In general, anything that can be owned or controlled to produce value, may be considered an asset and a transaction is an asset transfer onto or off of the ledger. The blockchain ledger is shared, replicated and synchronized among the network nodes and blockchain consensus is the collaborative process that the nodes of the blockchain network use to agree that a transaction is valid and to keep the ledger consistently synchronized. To reach consensus, the participants agree to the transaction and validate it before it is permanently recorded in the ledger.

The blockchain ledger's current state data is stored in the state database. When a participate of one or more blockchain networks queries the blockchain network for a particular data record, the data record and its associated data elements are read from the state database of the blockchain network.

Blockchain networks currently known in the art include Ethereum, Bitcoin and Hyperledger. Other data sources, such as legacy databases are also still commonly employed in the art for asset management. As the various blockchain networks have been introduced and other legacy database sources are maintained, duplicate entries in the various blockchain networks may have inconsistencies that are evident when a user queries on of the blockchain networks to retrieve a data record from a state databased associated with the blockchain network.

Figure 1:
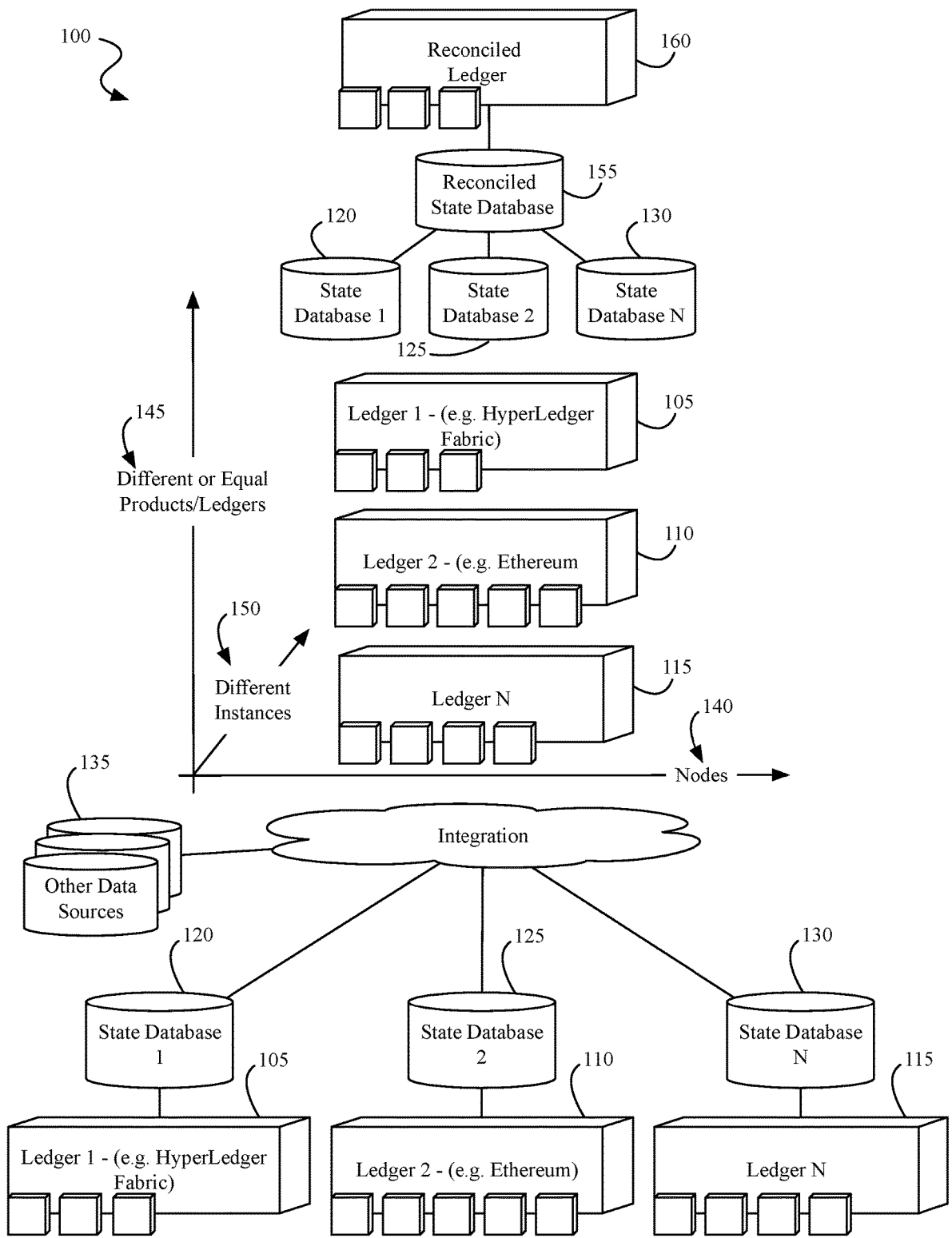
FIG. 1 is a diagrammatic view of the operation of the blockchain gateway device, in accordance with an embodiment of the present invention.

With reference to FIG. 1, a block diagram 100 illustrating the operation of a blockchain gateway device in accordance with the present invention is provided. In this exemplary embodiment, the blockchain gateway device integrates and reconciles the data records from two or more blockchain networks (Ledger N) and possibly any other non-blockchain databases. In this particular embodiment, the blockchain gateway device reconciles a Hyperledger blockchain ledger 105, an Ethereum blockchain ledger 110, other number of other (N) blockchain based ledgers 115 and other non-blockchain database sources. In the present invention, each of the blockchain networks has at least one participant in common. As such, the participant is a node in each of the blockchain based ledgers 105, 110, 115. Additionally, the blockchain networks 105, 110, 115 are independent of each other and store one or more data records that represent the same asset or transaction. The blockchain gateway device becomes one of the nodes in 140 in each of the independent instances of the blockchain networks 150. The blockchain networks may be different or equal blockchain technologies 145.

The blockchain gateway device of the present invention is integrated into each of the blockchain networks 105, 110, 115 and gains access to the other data sources 135. The blockchain gateway device is considered non-participating node in the independent blockchain networks and does not participate the consensus of data records in the blockchain networks 105, 110, 115.

In response to a query from a participant to access a data record in one of the blockchain networks 105, 110, 115, each of the state databases 120, 125, 130 associated with each of the blockchain networks 105, 110, 115 are accessed to retrieve the data record. The blockchain gateway intercepts the blockchain query from the participant and retrieves the data record from each of the state databases 120, 125, 130 associated with each of the blockchain networks 105, 110, 115. The blockchain gateway may also retrieve the data record from another data source 135.

Each data record retrieved comprises a plurality of data elements. While the data records retrieved represent the same transaction, the data elements in each of the data records may not be exactly the same and are therefore considered to be conflicting data elements. The blockchain gateway device of the present invention performs integration of the data records through the reconciliation of these conflicting data elements. The blockchain gateway compares the data elements of the data record retrieved from the state database associated with each of the independent blockchain networks 120, 125, 130 and any other data sources 135 to identify any conflicting data elements in the data records. If conflicting data elements are identified, the blockchain gateway device uses a predetermined set of rules to reconcile the data elements in the data records to generate a reconciled data record. The reconciled data record is then stored in a reconciled state database 155 associated with a reconciled blockchain network 160 in which the blockchain gateway device is a node. The blockchain gateway device then delivers the reconciled data record to the participant initiated the query for the data record.

In an exemplary embodiment, two different companies are in the business of trading computer equipment, such as laptops, hard disks, keyboards, etc., and the asset records for the equipment are stored in two independent blockchain distributed ledgers, wherein the independent blockchain distributed ledgers may be based upon different or equal technologies (i.e. Ethereum, Hyperledger). Each of the companies are participants in each of the independent blockchain networks and therefore have access to both blockchain ledgers, independently.

When a participant initiates a query for a data record from the state database of each of the independent blockchain ledgers, the data elements of the data record retrieved from the two blockchain ledgers may be identical or may differ. In a particular example, if the query from the participant is "Model/Serial No/Owner/Time Stamp", the result from a first blockchain ledger may be, "IBM Thinkpad/32586744/ Harald Müller GmpH/7/25/2017" and the result from a second blockchain ledger may be "Thinkpad/S 32586744/ Müller GmpH/26.7.2017". The retrieved data records appear to describe the same state, as it seems to be the same equipment with the same company at almost the same point in time (i.e. within 48 hrs.). However, there are conflicting data elements in the records. In order to establish a combined state database of an integrated ledger, the blockchain gateway device must reconcile the conflicting data elements without losing any information.

In this exemplary embodiment, the blockchain gateway device applies a predetermined set of rules to determine which of the conflicting data elements will be maintained in the reconciled data record. In particular, the blockchain gateway device may apply a rule wherein the data element "Model" is always taken as the longest string, which in this case would be "IBM Thinkpad". For the "Serial No" data element, a rule may be applied wherein only digits are used and all letters are eliminated, resulting in a reconciled data element of "32586755". A rule for the "Owner" data element may be applied which retains the longest string, thereby resulting in "Harald Müller GmpH". By applying the set of rules to the data elements of the data records, the blockchain gateway device establishes a reconciled data record which includes, "IBM Thinkpad/32586755/Harald Müller GmpH/ system date". The reconciliation process performed by the blockchain gateway device will be considered as a transaction recorded in a new, reconciled, blockchain network which contains cryptographically hashed values of the original data records and the applied rules are chain coded into the reconciled data record. The reconciled data record is then stored in the reconciled blockchain network and provided to the participant that initiated the query.

Additionally, if the blockchain gateway device is unable to reconcile one or more data elements, an unreconciled data record may be generated and stored as an unreconciled data record in an unreconciled state database.

As previously described, the gateway device may also become a node in a legacy database, such as a database that is not based on a blockchain technology. In this way, the blockchain gateway device may reconcile legacy data records from the legacy database with data records from one or more blockchain networks.

Figure 2:
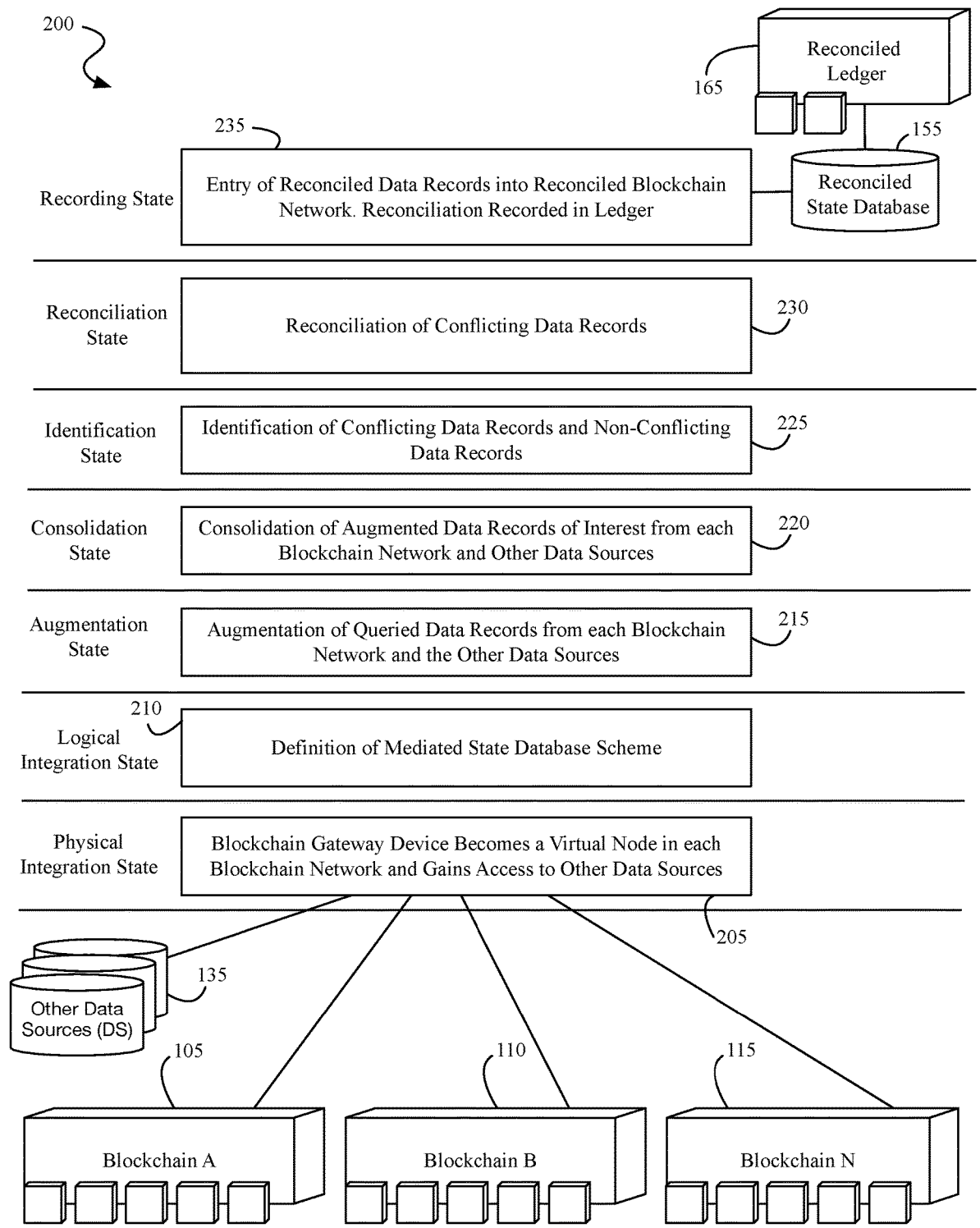
FIG. 2 is a diagrammatic view of the processing steps followed by the blockchain gateway device, in accordance with an embodiment of the present invention.

FIG. 2 is a diagrammatic view of the processing steps 200 followed by the blockchain gateway device. As shown in FIG. 2, at a physical integration state 205, the blockchain gateway device becomes a virtual, non-participating, node in a physical layer of each of the blockchain networks 105, 110, 115 and gains access to one or more legacy data sources 135.

At a logical integration state 210, a reconciled blockchain scheme is defined by combining each blockchain network and the other data sources. In this logical integration state 210, overlapping information in the data records is identified and the blockchain state databases and legacy data sources are mapped to the reconciled blockchain scheme.

At an augmentation state 215, the blockchain gateway device may add information to the queried data records, if necessary, from the various blockchain and legacy databases. This added information may include data elements such, as source, timestamps, consensus process, etc.

At a consolidation state 220, all the previously queried data records from the augmentation state 215 are disjunctively combined into a single data record. However, this data record may contain data elements which are in conflict with respect to the reconciled blockchain scheme. Accordingly, at an identification state 225, the blockchain gateway device identifies conflicting and non-conflicting data elements that need to be reconciled.

Following the identification of the conflicting data elements 225, the blockchain gateway device applies a predetermined set of rules to the conflicting data elements at a reconciliation state 230 to determine which conflicting data elements of the data records will prevail to generate a reconciled data record. The reconciled data record are then inserted into the reconciled state database 155 of the reconciled blockchain network at a recording state 235. If a data record cannot be reconciled, it may be stored in an alternative state database. The entries in these state databases are then recorded in the reconciled ledger 165 of another blockchain network, in which the blockchain gateway device is a node.

Figure 3:
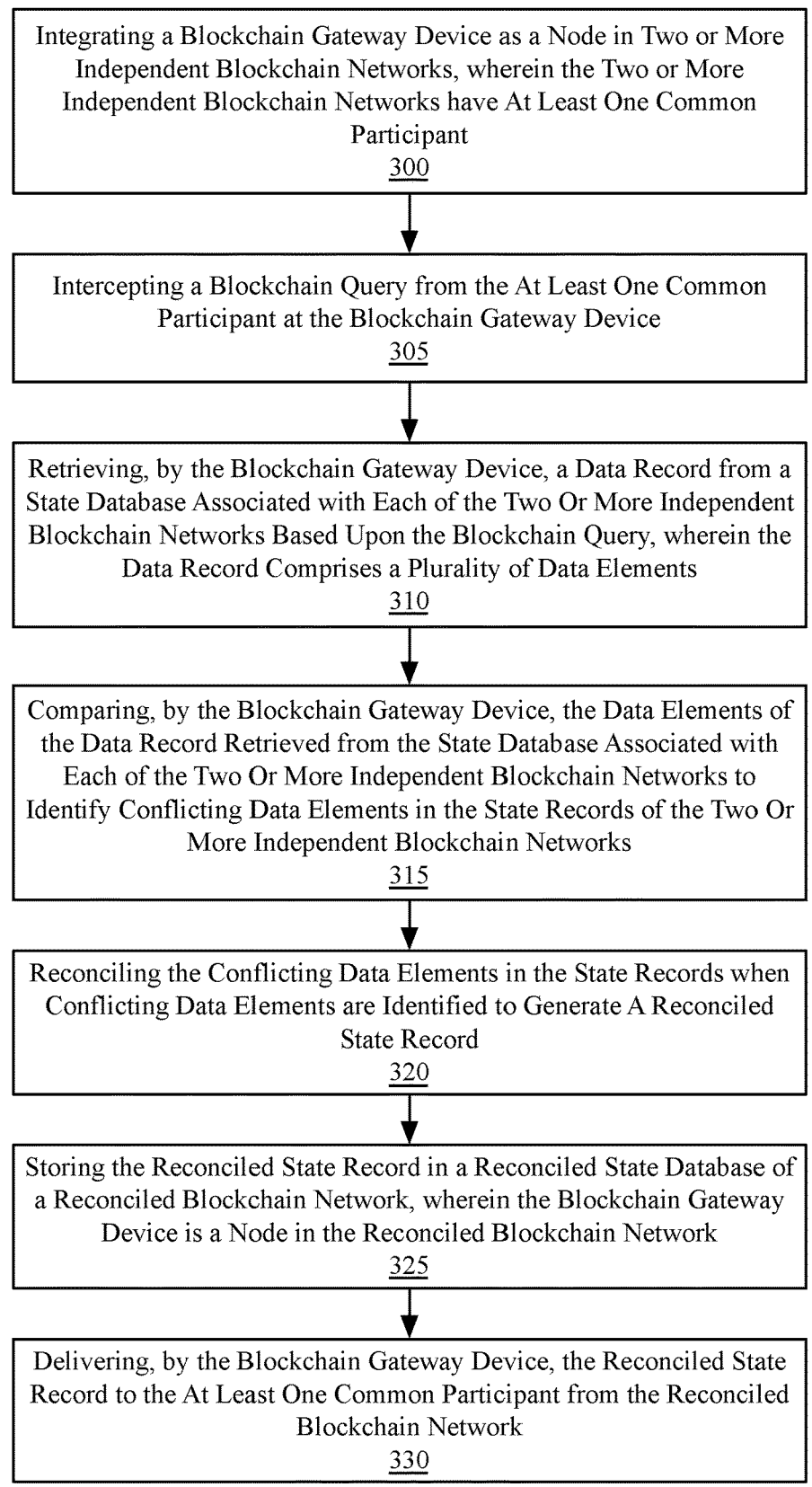
FIG. 3 is a flow diagram illustrating the method steps followed during the operation of the blockchain gateway device, in accordance with an embodiment of the present invention.

FIG. 3 is a flow diagram illustrating the method steps followed during the operation of the blockchain gateway device, in accordance with an embodiment of the present invention. At step 300, a blockchain gateway device is integrated as a node in two or more independent blockchain networks, wherein the two or more independent blockchain networks have at least one common participant. At step 305, a blockchain query from the at least one common participant is intercepted at the blockchain gateway device. At step, 310 the blockchain gateway device retrieves a data record from a state database associated with each of the two or more independent blockchain networks based upon the blockchain query, wherein the data record comprises a plurality of data elements. At step 315, the blockchain gateway device compares the data elements of the data record retrieved from the state database associated with each of the two or more independent blockchain networks to identify conflicting data elements in the state records of the two or more independent blockchain networks. At step 320, the conflicting data elements in the state records are reconciled, when conflicting data elements are identified, to generate a reconciled state record. At step 325, the reconciled state record is stored in a reconciled state database of a reconciled blockchain network, wherein the blockchain gateway device is a node in the reconciled blockchain network and at step 330, the reconciled state record is delivered to the at least one common participant from the reconciled blockchain network.

The blockchain technology of the independent blockchain networks may be the same or different technologies. While not intended to be limiting, the blockchain technology may be selected from a Bitcoin network an Ethereum network and a Hyperledger Fabric.

Figure 4:
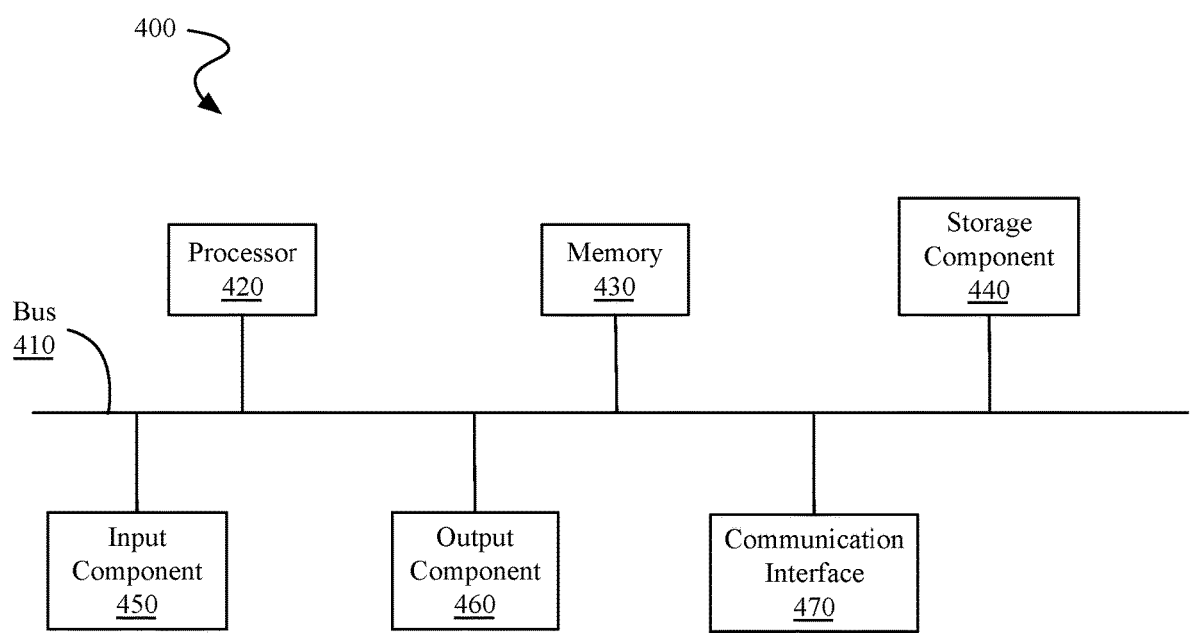
FIG. 4 is a block diagram illustrating the components of the blockchain gateway device, in accordance with an embodiment of the present invention.

FIG. 4 is a block diagram 400 illustrating the components of an exemplary blockchain gateway device, in accordance with the present invention. As shown in FIG. 4, the blockchain gateway device includes a processor 420 and one or more memory devices 430 storing computer-executable instructions that, when executed with the processor, cause the system to at least, integrate as a node in two or more independent blockchain networks, wherein the two or more independent blockchain networks have at least one common participant, intercept a blockchain query from the at least one common participant at the blockchain gateway device, retrieve a data record from a state database associated with each of the two or more independent blockchain networks based upon the blockchain query, wherein the data record comprises a plurality of data elements, compare the data elements of the data record retrieved from the state database associated with each of the two or more independent blockchain networks to identify conflicting data elements in the state records of the two or more independent blockchain networks, reconcile the conflicting data elements in the data records when conflicting data elements are identified to generate a reconciled data record, store the reconciled data record in a reconciled state database of a reconciled blockchain network and deliver the reconciled data record to the at least one common participant from the reconciled blockchain network.

In some implementations, the blockchain gateway device 400 may include one or more the components of the blockchain gateway device 400. As shown in FIG. 4, the blockchain gateway device 400 may include a bus 410, a processor 420, a memory 430, a storage component 440, an input component 450, an output component 460, and a communication interface 470.

Bus 410 may include circuitry that permits communication among the components of the blockchain gateway device 400. Processor 420 may be implemented in hardware, firmware, or a combination of hardware and software. Processor 420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 may include a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 may be configured for storing information and/or software related to the operation and use of the blockchain gateway device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 may include circuitry that allows the blockchain gateway device 400 to receive information, such as via user input, such as, a touch screen display, a keyboard, a keypad, a mouse, a button, a switch, and/or a microphone. Output component 460 may include a component that provides output information from the blockchain gateway device 400, such as a display or a speaker.

Communication interface 470 may include a transceiver circuitry that allows the blockchain gateway device 400 to communicate with other devices, such as via a wired connection, a wireless connection, or a combination of wired and wireless connections. Communication interface 470 may allow device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

The blockchain gateway device 400 may perform one or more processes described herein. The blockchain gateway device 400 may perform these processes based on the processor 420 executing software instructions stored by a non-transitory computer-readable medium, such as a memory 430 and/or storage component 440.

The specific arrangement of components shown in FIG. 4 are provided as an exemplary embodiment. In practice, the blockchain gateway device 400 may include additional components, fewer components, different components, or differently arranged components than those illustrated in FIG. 4.

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A computer-implemented method, comprising:
  integrating a blockchain gateway device as a non-participating node in two or more independent blockchain networks, wherein each of the two or more independent blockchain networks comprises an independent state database and wherein the two or more independent blockchain networks have at least one common participant, wherein the common participant has access to the independent state databases of each of the two or more independent blockchain networks and wherein as a non-participating node, the blockchain gateway device does not participate in a consensus of data records in the state database of any of the two or more independent blockchain networks;
  intercepting a blockchain query from the at least one common participant at the blockchain gateway device;
  retrieving, by the blockchain gateway device, a data record from the state database associated with each of the two or more independent blockchain networks based upon the blockchain query, wherein each of the data records comprise a plurality of data elements representing a transaction and wherein each of the data records retrieved from the state database associated with each of the two or more independent blockchain networks represent the same transaction;
  comparing, by the blockchain gateway device, the data elements of the data record retrieved from the state database associated with each of the two or more independent blockchain networks to identify conflicting data elements in the data records of the two or more independent blockchain networks;
  reconciling the conflicting data elements in the data records when conflicting data elements are identified by applying a predetermined set of rules to the conflicting data elements to determine which of the conflicting data elements will be maintained in a reconciled data record;
  generating the reconciled data record, wherein the reconciled data record comprises a cryptographically hashed value of the data records and a chain code of the predetermined set of rules that were applied to the conflicting data elements to determine which of the conflicting data elements will be maintained in the reconciled data record;
  storing the reconciled data record in a reconciled state database of a reconciled blockchain network, wherein the blockchain gateway device is a node in the reconciled blockchain network, wherein the reconciled blockchain network is a different blockchain network than any of the two or more independent blockchain networks and the reconciled state database is a different state database than any of the two or more independent state databases; and
  delivering, by the blockchain gateway, the reconciled data record to the at least one common participant from the reconciled blockchain network.

2. The method of claim 1, further comprising:
  identifying conflicting data records having one or more data elements that cannot be reconciled to generate an unreconciled data record; and
  storing the unreconciled data record in an unreconciled state database.

3. The method of claim 1, further comprising
  integrating the blockchain gateway device as a node in a legacy database comprising the at least one common participant;
  retrieving, by the blockchain gateway device, a legacy data record from the legacy database based upon the blockchain query, wherein the legacy data record comprises a plurality of data elements;
  comparing, by the blockchain gateway device, the data elements of the data records retrieved from the state database associated with one or more of the two or more independent blockchain networks and the data elements of the legacy data record from the legacy database to identify conflicting data elements; and
  reconciling, by the blockchain gateway device, the conflicting data elements in the data records when conflicting data elements are identified to generate the reconciled data record.

4. The method of claim 1, further comprising, prior to comparing, by the blockchain gateway device, the data elements of the data record retrieved from the state database associated with each of the two or more independent blockchain networks, identify conflicting data elements in the data records of the two or more independent blockchain networks, adding one or more data elements from each of the data records retrieved from the state database associated with each of the two or more independent blockchain networks to the data records.

5. The method of claim 1, further comprising, prior to comparing, by the blockchain gateway device, the data elements of the data record retrieved from the state database associated with each of the two or more independent blockchain networks to identify conflicting data elements in the data records of the two or more independent blockchain networks, combining the data elements from each of the data records retrieved from the state database associated with each of the two or more independent blockchain networks to the data records.

6. The method of claim 1, prior to comparing, by the blockchain gateway device, the data elements of the data record retrieved from the state database associated with each of the two or more independent blockchain networks to identify conflicting data elements in the data records of the two or more independent blockchain networks, separating the data records between conflicting data records having one or more conflicting data elements and non-conflicting data records having no conflicting data elements, prior to comparing the data records.

7. The method of claim 1, wherein a blockchain technology for the two or more independent blockchain networks is selected from a Bitcoin network an Ethereum network and a Hyperledger Fabric.

8. The method of claim 1, wherein the two or more independent blockchain networks utilize the same blockchain technology or a different blockchain technology.

9. A blockchain gateway system, the device comprising:
a processor; and
one or more memory devices storing computer-executable instructions that, when executed with the processor, cause the system to at least:
  integrate as a non-participating node in two or more independent blockchain networks, wherein each of the two or more independent blockchain networks comprises an independent state database and wherein the two or more independent blockchain networks have at least one common participant, wherein the common participant has access to the independent state databases of each of the two or more independent blockchain networks and wherein the non-participating node does not participate in a consensus of data records in the two or more independent blockchain networks;
  intercept a blockchain query from the at least one common participant at the blockchain gateway device;
  retrieve a data record from the state database associated with each of the two or more independent blockchain networks based upon the blockchain query, wherein each of the data comprise a plurality of data elements representing a transaction and wherein the data records retrieved from the state database associated with each of the two or more independent blockchain networks represent the same transaction;
  compare the data elements of the data record retrieved from the state database associated with each of the two or more independent blockchain networks to identify conflicting data elements in the data records of the two or more independent blockchain networks;
  reconcile the conflicting data elements in the data records when conflicting data elements are identified by applying a predetermined set of rules to the conflicting data elements to determine which of the conflicting data elements will be maintained in a reconciled data record;
  generate the reconciled data record, wherein the reconciled data record comprises a cryptographically hashed value of the data records and a chain code of the predetermined set of rules that were applied to the conflicting data elements to determine which of the conflicting data elements will be maintained in the reconciled data record;
  store the reconciled data record in a reconciled state database of a reconciled blockchain network, wherein the reconciled blockchain network is a different blockchain network than any of the two or more independent blockchain networks and the reconciled state database is a different state database than any of the two or more independent state databases; and
  deliver the reconciled data record to the at least one common participant from the reconciled blockchain network.

10. The system of claim 9, wherein the one or more memory devices storing computer-executable instructions that, when executed with the processor, cause the system to further:
  identify conflicting data records having one or more data elements that cannot be reconciled to generate an unreconciled data record; and
  store the unreconciled data record in an unreconciled state database.

11. The system of claim 9, wherein the one or more memory devices storing computer-executable instructions that, when executed with the processor, cause the system further to:
  integrate as a node in a legacy database comprising the at least one common participant;
  retrieve a legacy data record from the legacy database based upon the blockchain query, wherein the legacy data record comprises a plurality of data elements;
  compare the data elements of the data records retrieved from the state database associated with one or more of the two or more independent blockchain networks and the data elements of the legacy data record from the legacy database to identify conflicting data elements; and
  reconcile the conflicting data elements in the data records when conflicting data elements are identified to generate the reconciled data record.

12. The system of claim 9, wherein the one or more memory devices storing computer-executable instructions that, when executed with the processor, cause the system further to, add one or more data elements from each of the data records retrieved from the state database associated with each of the two or more independent blockchain networks to the data records, prior to comparing the data records.

13. The system of claim 9, wherein the one or more memory devices storing computer-executable instructions that, when executed with the processor, cause the system further to, combine the data elements from each of the data records retrieved from the state database associated with each of the two or more independent blockchain networks to the data records, prior to comparing the data records.

14. The system of claim 9, wherein the one or more memory devices storing computer-executable instructions that, when executed with the processor, cause the system further to, separate the data records between conflicting data records having one or more conflicting data elements and non-conflicting data records having no conflicting data elements, prior to comparing the data records.

15. The system of claim 9, wherein a blockchain technology for the two or more independent blockchain networks is selected from a Bitcoin network an Ethereum network and a Hyperledger Fabric.

16. The system of claim 9, wherein the two or more independent blockchain networks utilize the same blockchain technology or a different blockchain technology.

17. A non-transitory computer-readable storage medium comprising computer-readable instructions which, when executed by one or more processors, cause the one or more processors to:
- integrate as a non-participating node in two or more independent blockchain networks, wherein each of the two or more independent blockchain networks comprises an independent state database and wherein the two or more independent blockchain networks have at least one common participant, wherein the common participant has access to the independent state databases of each of the two or more independent blockchain networks and wherein the non-participating node does not participate in a consensus of data records in the two or more independent blockchain networks;
- intercept a blockchain query from the at least one common participant at the blockchain gateway device;
- retrieve a data record from the state database associated with each of the two or more independent blockchain networks based upon the blockchain query, wherein each of the data comprise a plurality of data elements representing a transaction and wherein the data records retrieved from the state database associated with each of the two or more independent blockchain networks represent the same transaction;
- compare the data elements of the data record retrieved from the state database associated with each of the two or more independent blockchain networks to identify conflicting data elements in the data records of the two or more independent blockchain networks;
- reconcile the conflicting data elements in the data records when conflicting data elements are identified by applying a predetermined set of rules to the conflicting data elements to determine which of the conflicting data elements will be maintained in a reconciled data record;
- generate the reconciled data record, wherein the reconciled data record comprises a cryptographically hashed value of the data records and a chain code of the predetermined set of rules that were applied to the conflicting data elements to determine which of the conflicting data elements will be maintained in the reconciled data record;
- store the reconciled data record in a reconciled state database of a reconciled blockchain network, wherein the reconciled blockchain network is a different blockchain network than any of the two or more independent blockchain networks and the reconciled state database is a different state database than any of the two or more independent state databases; and
- deliver the reconciled data record to the at least one common participant from the reconciled blockchain network.

* * * * *